C. NEWMAN.
Fruit Jar.
No. 1,105. Reissued Dec. 18, 1860.
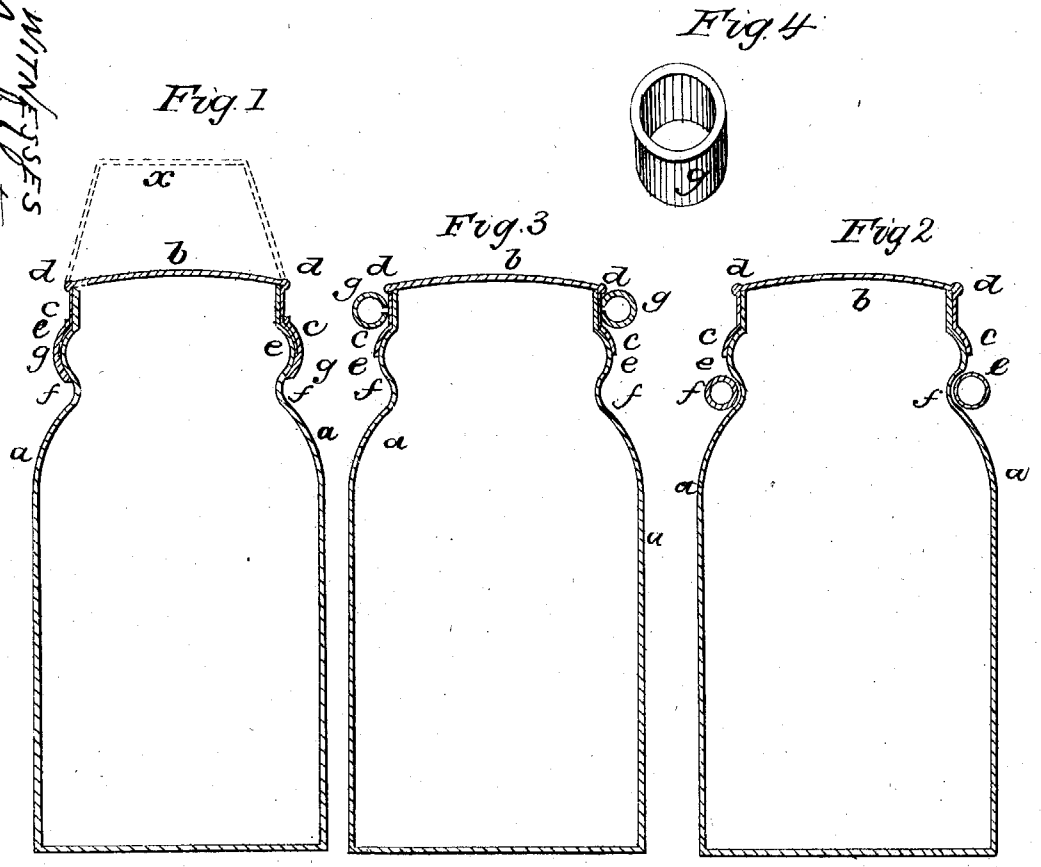
WITNESSES
James J. Johnston
George P. Steck
INVENTOR
Charlton Newman
N. PETERS. Photo-Lithographer, Washington, D. C.

UNITED STATES PATENT OFFICE.

CARLTON NEWMAN, OF BIRMINGHAM, PENNSYLVANIA.

IMPROVEMENT IN PRESERVE-CANS.

Specification forming part of Letters Patent No. 23,515, dated December 20, 1859; Reissue No. 1,105, dated December 18, 1860.

*To all whom it may concern:*

Be it known that I, CARLTON NEWMAN, of Birmingham, in the county of Allegheny and State of Pennsylvania, have invented a new and useful Improvement in Preserve-Cans; and I do hereby declare that the following is a full and exact description thereof, reference being had to the accompanying drawings, and to the letters of reference marked thereon.

The nature of my invention consists in the use of a detached elastic band for the purpose of holding the lid down to its place and resisting the internal pressure caused by the heated air or steam which rises from the heated or boiling fruit when placed in jars or cans for preservation.

My invention further consists in an arrangement of a flaring flange on the lid, and a rib or ridge on and a groove in the neck of the jar or can, said flaring flange, rib, or ridge, and groove being used for holding the detached band on the lid or neck of the jar or can, and also for causing the greatest pressure of the band to be directly over the joint for the purpose of hermetically sealing it and excluding the air.

In the accompanying drawings, Figure 1 is a central section of the jar, lid, and band, representing the position of the lid and band on the jar when properly arranged for preserving fruit. Fig. 2 is a central section of the lid, band, and jar, and represents the band rolled down on the neck of the jar. Fig. 3 is a central section of the lid, band, and jar, and represents the band rolled up on the lid. Fig. 4 is a perspective view of the loose or detached band. The red dotted lines represent the form of the lid, and the form of the rib or ridge on the neck of the jar when the lid is made of glass, china, porcelain, or Delft ware.

In putting up fruit for preservation it is necessary in all cases to put it into the jars or cans in a heated or boiling state, and the jars or cans must be sealed while the fruit is in this heated or boiling condition, and the heated air or steam which rises from it will create in the jar or can an internal force or pressure sufficient to displace the lid. I counteract this internal force or pressure and hold the lid to its place by the use of a detached elastic band, which is made much smaller in diameter than the lid or neck of the jar. The band is placed on the lid or neck of the jar by pressing it over a conical-shaped instrument. The red dotted lines at *x* will give an idea of the instrument and its position when used in placing the band on the lid. It will be very difficult to place a band on the lid or on the neck of the jar with sufficient contracting power to hold down the lid and make the jar perfectly air-tight without the aid of some suitable instrument.

*a* is the jar. *b* is the lid of the jar. *c* is the flaring rim of the lid. *d* is a rib or ridge of the lid. *e* is the rib or ridge on the neck of the jar. *f* is a groove in the neck of the jar. *g* is the loose or detached india-rubber band. By the arrangement of the flaring rim *c* of the lid and the ridge *e* on the neck of the jar the joint between the lid and jar is brought on or near to the center of the rib *e*, thereby causing the greatest pressure of the band to be directly over the joint. By the arrangement of the flaring rim *c* and the rib or ridge *d* the india-rubber band will be held on the lid. The groove *f* in the neck of the jar, in connection with the rib or ridge *e*, will hold the band on the neck of the jar. Thus a detached band may be used and shifted from the lid down onto or up from the neck of the jar onto the lid at pleasure without the liability of having to replace the loose or detached band a second time on the lid or on the neck of the jar, and without the liability of losing the band. By this arrangement of the flaring rim on the lid and the rib or ridge on the neck of the jar, the lid will be held down firmly by the contraction of the band in its width, for it will be readily observed that the band, when placed over the flaring rim of the lid and over the rib or ridge on the neck of the jar, will contract in its width as well as toward the center of its diameter. By the arrangement of the rib or ridge *e* and the groove *f*, when any defect is found in the lid which would prevent the perfect sealing of the jar, the band can be readily shifted down onto the neck of the jar, and there held by the rib or ridge *e* until another lid is placed on the jar, and should any cause arise demanding a change of the lid the change can be made with ease and speed by this arrangement of the rib or ridge *e* and the groove *f*.

The operation of securing the lid on the jar is as follows: Having the band placed on the lid, as seen in Fig. 3, the lid is placed on the jar and the band unrolled down over the flaring rim of the lid and over the rib or ridge on the neck of the jar, when the band is placed on the neck of the jar, as seen in Fig. 2, the band is unrolled up over the rib or ridge on the neck of the jar, and over the flaring rim of the lid. The lid is removed from off the jar by simply rolling the band onto the lid or down onto the neck of the jar. The proper position of the band is represented in Fig. 1.

I am aware that an india-rubber band permanently attached to the lid of the jar and used in connection with a metal clamp for the purpose of sealing fruit jars or cans has been used, such device being seen in the patent of H. G. Dayton, patented June 8, 1858. I am also aware that a detached india-rubber band has been applied round the joint or external part of union of the cover with the body of a jelly-mold; but in all cases the periphery or imitation of the cover with the mold was rendered of uniform surface by a thickness ring for the purpose of affording a proper contact-surface for the india-rubber band. Such device is found in the English patent of Thomas Masters, No. 13,857, A. D. 1851. Therefore, I do not claim either of these devices, nor do I claim the general use of india-rubber bands for the purpose of sealing fruit jars or cans; but What I do claim as of my invention is—

The arrangement of the flaring flange on the lid, and a rib or ridge on and a groove in the neck of the jar or can, when used for holding the detached elastic band on the lid or neck of the jar or can, and also for causing the greatest pressure of the band to be directly over the joint, for the purpose of hermetically sealing it and excluding the air, as herein described and set forth.

CARLTON NEWMAN.

Witnesses:
JAMES J. JOHNSTON,
GEORGE P. STECK.